(12) United States Patent
Ebrahimzadeh

(10) Patent No.: US 12,466,355 B1
(45) Date of Patent: Nov. 11, 2025

(54) REMOTELY-CONTROLLABLE SEATBELT SYSTEM

(71) Applicant: David J. Ebrahimzadeh, New York, NY (US)

(72) Inventor: David J. Ebrahimzadeh, New York, NY (US)

( * ) Notice: Subject to any disclaimer, the term of this patent is extended or adjusted under 35 U.S.C. 154(b) by 0 days.

(21) Appl. No.: 19/174,062

(22) Filed: Apr. 9, 2025

(51) Int. Cl.
    *B60R 22/32*     (2006.01)
    *B60R 22/48*     (2006.01)

(52) U.S. Cl.
    CPC .......... *B60R 22/325* (2013.01); *B60R 22/48* (2013.01); *B60R 2022/4816* (2013.01)

(58) Field of Classification Search
    CPC ............ B60R 22/325; B60R 22/48; B60R 2022/4816
    See application file for complete search history.

(56) References Cited

U.S. PATENT DOCUMENTS

| | | | |
|---|---|---|---|
| 2006/0080812 A1* | 4/2006 | O'Brien | A44B 11/25 24/633 |
| 2010/0101060 A1* | 4/2010 | Walega | A44B 11/2523 24/633 |
| 2022/0105895 A1* | 4/2022 | Simonelli | A63G 7/00 |

* cited by examiner

*Primary Examiner* — Michael C Zarroli
(74) *Attorney, Agent, or Firm* — Brian J. Colandreo; Heath M. Sargeant; Holland & Knight LLP

(57) ABSTRACT

A remotely-lockable seatbelt latch receptacle is configured for use within a vehicle and includes: a latch receiver configured to receive a seatbelt latch assembly; a coupling assembly configured to releasably engage a portion of the seatbelt latch assembly and temporarily prevent the removal of the seatbelt latch assembly from the latch receiver; and a selectively-operable disengagement assembly configured to override the coupling assembly to enable removal of the seatbelt latch assembly from the latch receiver.

22 Claims, 2 Drawing Sheets

REMOTELY-CONTROLLABLE SEATBELT SYSTEM

TECHNICAL FIELD

This disclosure relates to seatbelt systems and, more particularly, to remotely-controllable seatbelt systems.

BACKGROUND

The history of seatbelts dates back to the late 19th century when Edward J. Claghorn patented the first safety belt in 1885. Initially designed for passengers in horse-drawn carriages, these early seatbelts were rudimentary and primarily intended to prevent people from falling out. In the early 20th century, seatbelts started gaining importance in aviation and motorsports, where pilots and racecar drivers needed restraint systems to prevent serious injuries during crashes or turbulence. By the 1950s, the automobile industry began recognizing the importance of seatbelts for everyday drivers, with some manufacturers offering lap belts as optional features. A significant breakthrough came in 1959 when Volvo engineer Nils Bohlin invented the three-point seatbelt, which provided superior protection by securing both the upper and lower body. Volvo recognized the life-saving potential of this design and made the patent freely available, allowing other automakers to adopt it as a standard safety feature.

During the 1960s and 1970s, governments worldwide started enacting laws requiring seatbelts to be installed in vehicles, although wearing them was not always mandatory at first. In 1968, the United States passed a law requiring all new cars to be equipped with seatbelts. Australia became a pioneer in seatbelt legislation by becoming the first country to mandate their use for drivers and front-seat passengers in 1970. Over the following decades, numerous countries introduced similar laws, gradually expanding them to include backseat passengers as well. By the 1980s and 1990s, as public awareness of road safety increased, seatbelt usage became widely accepted, and strict enforcement measures were implemented to encourage compliance. Research and crash statistics consistently showed that seatbelts dramatically reduced the risk of severe injury and fatalities in accidents. Today, nearly every country has seatbelt laws, with penalties and fines in place for those who fail to comply.

Alongside the evolution of seatbelt technology, systems for monitoring their use have also developed over time. In the 1970s, automakers in the U.S. introduced early seatbelt reminder systems (SBR), which used simple buzzers and dashboard warning lights to alert drivers if their seatbelt was not fastened. However, many drivers found these systems intrusive, leading to resistance and modifications to regulations. By the 1990s, advancements in sensor technology allowed for more sophisticated seatbelt detection systems that could determine whether a seat was occupied and whether the seatbelt was engaged, leading to more effective reminder mechanisms.

In the 2010s, intelligent monitoring systems became increasingly integrated with vehicle electronics. These systems not only detected seatbelt usage but also provided more persistent reminders and linked seatbelt compliance to other safety features, such as airbags. For example, some vehicles now prevent the car from being driven unless the driver's seatbelt is fastened. Additionally, fleet management systems began incorporating seatbelt monitoring as a way to improve safety among commercial drivers, using telematics to track seatbelt use in real-time and report violations.

Today, AI-powered monitoring systems are being developed to enhance seatbelt compliance further. Some vehicles now feature cameras and facial recognition technology that detect whether a seatbelt is properly worn, even if the occupant tries to bypass the system. Advanced driver assistance systems (ADAS) and connected vehicle technologies allow real-time reporting of seatbelt use, making it possible for fleet operators, parents, or insurance companies to monitor compliance. Safety organizations such as Euro NCAP and the Insurance Institute for Highway Safety (IIHS) now require effective seatbelt reminder systems as part of their safety rating criteria.

Looking ahead, future developments may involve even more automated enforcement measures, such as vehicles that refuse to start unless all occupants are buckled up, or integration with smart infrastructure that can detect seatbelt use and issue automatic fines for non-compliance. As vehicle technology advances, seatbelt monitoring systems will likely become even more intelligent, further reinforcing the importance of this essential safety feature in reducing road injuries and fatalities.

SUMMARY OF DISCLOSURE

In one implementation, a remotely-lockable seatbelt latch receptacle is configured for use within a vehicle and includes: a latch receiver configured to receive a seatbelt latch assembly; a coupling assembly configured to releasably engage a portion of the seatbelt latch assembly and temporarily prevent the removal of the seatbelt latch assembly from the latch receiver; and a selectively-operable disengagement assembly configured to override the coupling assembly to enable removal of the seatbelt latch assembly from the latch receiver.

One or more of the following features may be included. The selectively-operable disengagement assembly may be configured to be externally controllable to prevent unauthorized removal of the seatbelt latch assembly from the latch receiver. The selectively-operable disengagement assembly may be configured to allow the seatbelt latch assembly to be removed from the latch receiver in the event of an external authorization. The external authorization may be provided via an authorization signal received from a remote device. The remote device may be a switch assembly included within the vehicle. The selectively-operable disengagement assembly may be configured to allow the seatbelt latch assembly to be removed from the latch receiver in the event of an emergency situation concerning the vehicle. The selectively-operable disengagement assembly may be configured to allow the seatbelt latch assembly to be removed from the latch receiver in the event of an accident concerning the vehicle. The selectively-operable disengagement assembly may include a disengagement mechanism configured to interface with and override the coupling assembly to enable removal of the seatbelt latch assembly from the latch receiver. The selectively-operable disengagement assembly may be configured to disable the disengagement mechanism to prevent removal of the seatbelt latch assembly from the latch receiver. The selectively-operable disengagement assembly may be configured to prevent operation of the disengagement mechanism to prevent removal of the seatbelt latch assembly from the latch receiver.

In another implementation, a remotely-lockable seatbelt system for use within a vehicle includes: a belt assembly; a seatbelt latch assembly coupled to the belt assembly; and a remotely-lockable seatbelt latch receptacle configured to releasably engage a portion of the seatbelt latch assembly.

One or more of the following features may be included. The remotely-lockable seatbelt latch receptacle may include: a latch receiver configured to receive the seatbelt latch assembly; a coupling assembly configured to releasably engage a portion of the seatbelt latch assembly and temporarily prevent the removal of the seatbelt latch assembly from the latch receiver; and a selectively-operable disengagement assembly configured to override the coupling assembly to enable removal of the seatbelt latch assembly from the latch receiver. The selectively-operable disengagement assembly may be configured to be externally controllable to prevent unauthorized removal of the seatbelt latch assembly from the latch receiver. The selectively-operable disengagement assembly may be configured to allow the seatbelt latch assembly to be removed from the latch receiver in the event of an external authorization. The external authorization may be provided via an authorization signal received from a remote device. The remote device may be a switch assembly included within the vehicle. The selectively-operable disengagement assembly may be configured to allow the seatbelt latch assembly to be removed from the latch receiver in the event of an emergency situation concerning the vehicle. The selectively-operable disengagement assembly may be configured to allow the seatbelt latch assembly to be removed from the latch receiver in the event of an accident concerning the vehicle. The selectively-operable disengagement assembly may include a disengagement mechanism configured to interface with and override the coupling assembly to enable removal of the seatbelt latch assembly from the latch receiver. The selectively-operable disengagement assembly may be configured to disable the disengagement mechanism to prevent removal of the seatbelt latch assembly from the latch receiver. The selectively-operable disengagement assembly may be configured to prevent operation of the disengagement mechanism to prevent removal of the seatbelt latch assembly from the latch receiver.

In another implementation, a remotely-lockable seatbelt system for use within a vehicle includes: a belt assembly; a seatbelt latch assembly coupled to the belt assembly; and a remotely-lockable seatbelt latch receptacle configured to releasably engage a portion of the seatbelt latch assembly, wherein the remotely-lockable seatbelt latch receptacle is configured to be externally controllable to prevent unauthorized removal of the seatbelt latch assembly from the latch receiver and includes: a latch receiver configured to receive the seatbelt latch assembly, a coupling assembly configured to releasably engage a portion of the seatbelt latch assembly and temporarily prevent the removal of the seatbelt latch assembly from the latch receiver, and a selectively-operable disengagement assembly configured to override the coupling assembly to enable removal of the seatbelt latch assembly from the latch receiver.

One or more of the following features may be included. The selectively-operable disengagement assembly may be configured to allow the seatbelt latch assembly to be removed from the latch receiver in the event of an external authorization. The external authorization may be provided via an authorization signal received from a remote device. The remote device may be a switch assembly included within the vehicle. The selectively-operable disengagement assembly may be configured to allow the seatbelt latch assembly to be removed from the latch receiver in the event of an emergency situation concerning the vehicle. The selectively-operable disengagement assembly may be configured to allow the seatbelt latch assembly to be removed from the latch receiver in the event of an accident concerning the vehicle. The selectively-operable disengagement assembly may include a disengagement mechanism configured to interface with and override the coupling assembly to enable removal of the seatbelt latch assembly from the latch receiver. The selectively-operable disengagement assembly may be configured to disable the disengagement mechanism to prevent removal of the seatbelt latch assembly from the latch receiver. The selectively-operable disengagement assembly may be configured to prevent operation of the disengagement mechanism to prevent removal of the seatbelt latch assembly from the latch receiver.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
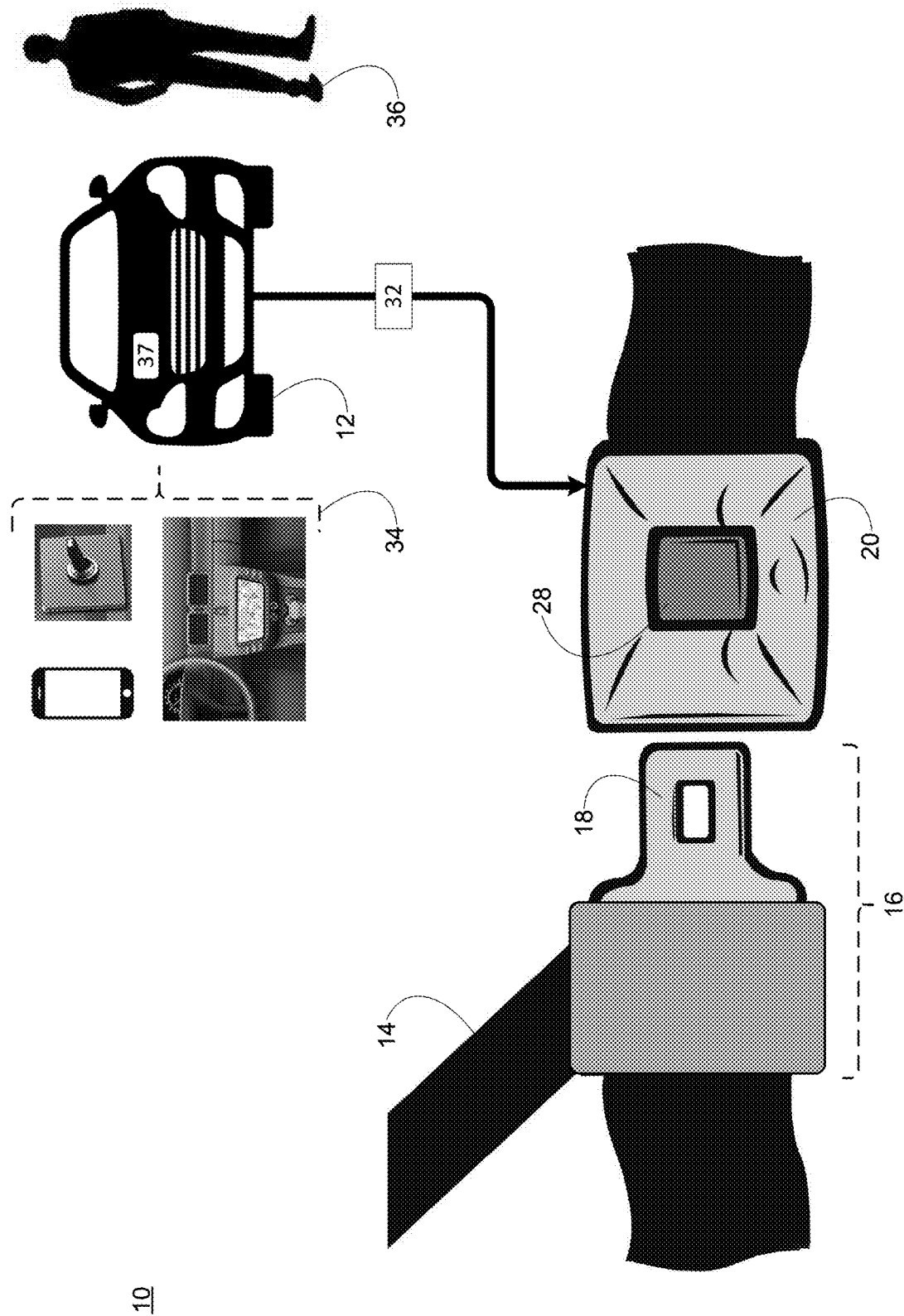
FIGS. 1-2 are diagrammatic views of a remotely-lockable seatbelt system according to an embodiment of the present disclosure.
Figure 2:
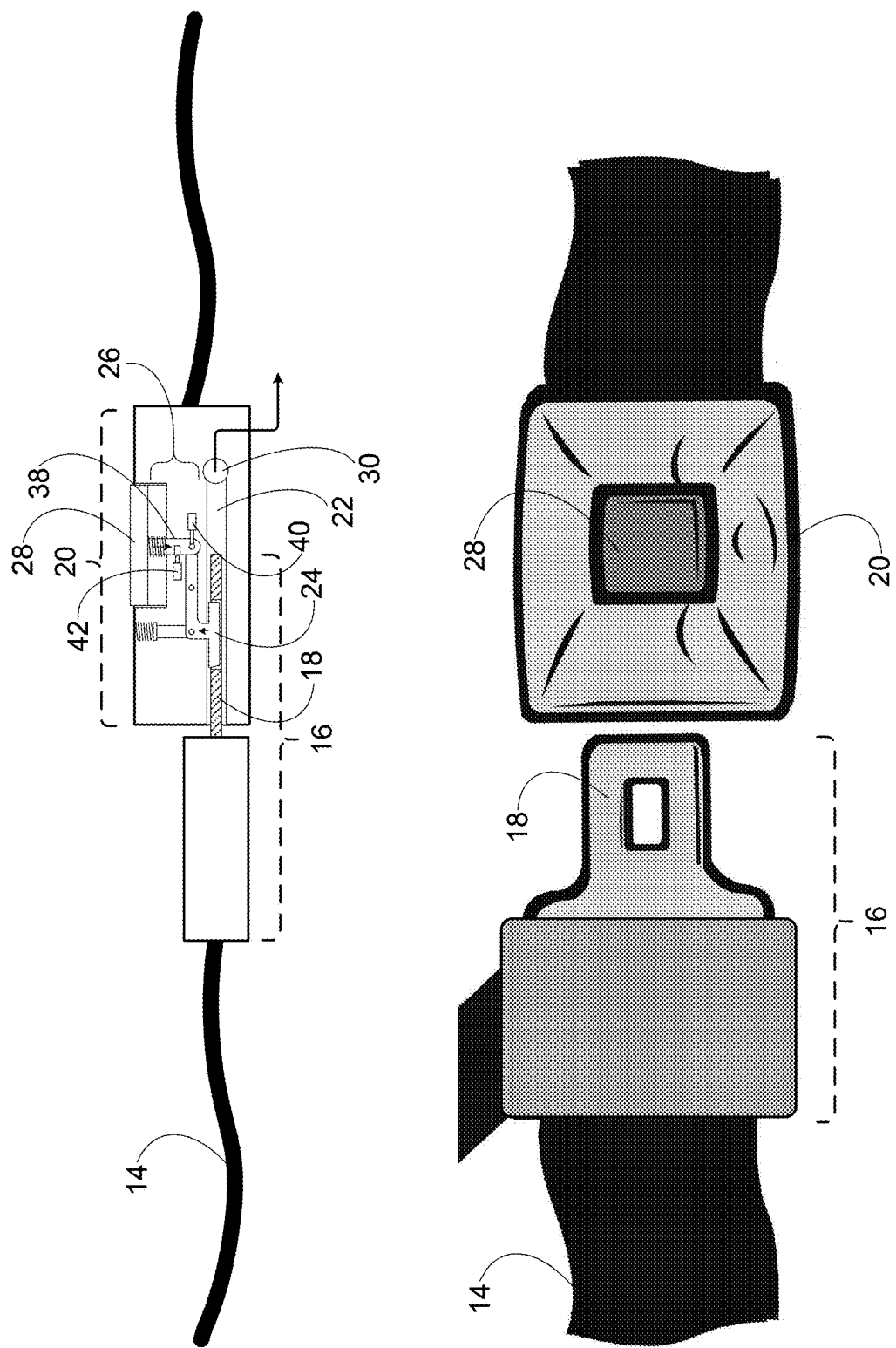

Referring to FIGS. 1-2, there is shown a remotely-lockable seatbelt system (e.g., remotely-lockable seatbelt system 10) for use within a vehicle (e.g., vehicle 12). The remotely-lockable seatbelt system (e.g., remotely-lockable seatbelt system 10) may include a belt assembly (e.g., belt assembly 14) and a seatbelt latch assembly (e.g., seatbelt latch assembly 16) coupled to the belt assembly (e.g., belt assembly 14).

The remotely-lockable seatbelt system (e.g., remotely-lockable seatbelt system 10) is an important safety feature in vehicles (e.g., vehicle 12). The belt assembly (e.g., belt assembly 14) and the seatbelt latch assembly (e.g., seatbelt latch assembly 16) work together to secure occupants of the vehicle (e.g., vehicle 12) and minimize injury risks during collisions or sudden stops. The belt assembly (e.g., belt assembly 14) is responsible for restraining the occupant while allowing controlled movement under normal driving conditions. The belt assembly (e.g., belt assembly 14) includes the webbing, a high-strength polyester fabric designed to withstand extreme forces while remaining flexible and comfortable for the user. This webbing typically extends across the occupant's torso and lap, distributing impact forces evenly to prevent concentrated stress on any single body part.

The belt assembly (e.g., belt assembly 14) typically also features a retractor mechanism (not shown), which is a spool-like device that allows the belt assembly (e.g., belt assembly 14) to extend and retract smoothly. This retractor mechanism typically incorporates an inertia reel, which locks the belt assembly (e.g., belt assembly 14) in place during sudden deceleration or impact, preventing excessive forward movement of the occupant. Many modern vehicles may also be equipped with a pretensioner (not shown), a device that tightens the belt assembly (e.g., belt assembly 14) in the event of a crash by pulling in excess slack, thereby ensuring the occupant is held firmly in place before the impact occurs. Additionally, anchor points (not shown)

secure the belt assembly (e.g., belt assembly 14) to the vehicle's structure, ensuring stability and strength. These anchor points typically include a lower attachment near the seat and an upper guide loop for shoulder belts. Some seatbelt systems (e.g., remotely-lockable seatbelt system 10) may also incorporate adjusters, which may be manual or automatic, to customize the fit for different occupant sizes and seating positions, enhancing both comfort and effectiveness.

The latch assembly (e.g., seatbelt latch assembly 16), which is attached to the belt assembly (e.g., belt assembly 14), serves as the key interface for securing the occupant. It consists of a latch plate (e.g., latch plate 18), also called a tongue, which is a metal component fixed to the webbing of the belt assembly (e.g., belt assembly 14).

The remotely-lockable seatbelt system (e.g., remotely-lockable seatbelt system 10) may include a remotely-lockable seatbelt latch receptacle (e.g., remotely-lockable seatbelt latch receptacle 20) configured to releasably engage a portion (e.g., latch plate 18) of the seatbelt latch assembly (e.g., seatbelt latch assembly 16).

Generally speaking and in a seatbelt system (e.g., remotely-lockable seatbelt system 10), the latch plate (e.g., latch plate 18) of the seatbelt latch assembly (e.g., seatbelt latch assembly 16) is inserted into the remotely-lockable seatbelt latch receptacle (e.g., remotely-lockable seatbelt latch receptacle 20), an important component responsible for securely coupling the seatbelt system (e.g., remotely-lockable seatbelt system 10) to ensure the occupant remains restrained during operation of the vehicle (e.g., vehicle 12). The remotely-lockable seatbelt latch receptacle (e.g., remotely-lockable seatbelt latch receptacle 20) is typically mounted on the vehicle's seat or floor (not shown) and is positioned for easy accessibility while providing a strong, stable anchor point.

The remotely-lockable seatbelt latch receptacle (e.g., remotely-lockable seatbelt latch receptacle 20) may be designed to receive and lock the latch plate (e.g., latch plate 18) of the seatbelt latch assembly (e.g., seatbelt latch assembly 16), which is attached to the belt webbing of the belt assembly (e.g., belt assembly 14). The latch plate (e.g., latch plate 18) of the seatbelt latch assembly (e.g., seatbelt latch assembly 16) is a durable metal component that slides along the webbing of the belt assembly (e.g., belt assembly 14) for adjustability and is specifically shaped to engage with the internal locking mechanism of the remotely-lockable seatbelt latch receptacle (e.g., remotely-lockable seatbelt latch receptacle 20).

The remotely-lockable seatbelt latch receptacle (e.g., remotely-lockable seatbelt latch receptacle 20) may include a latch receiver (e.g., latch receiver 22) configured to receive the latch plate (e.g., latch plate 18) of the seatbelt latch assembly (e.g., seatbelt latch assembly 16). For example, the latch receiver (e.g., latch receiver 22) may be configured as a slot into which the latch plate (e.g., latch plate 18) of the seatbelt latch assembly (e.g., seatbelt latch assembly 16) is inserted.

The remotely-lockable seatbelt latch receptacle (e.g., remotely-lockable seatbelt latch receptacle 20) may also include a coupling assembly (e.g., coupling assembly 24) configured to releasably engage a portion (e.g., latch plate 18) of the seatbelt latch assembly (e.g., seatbelt latch assembly 16) and temporarily prevent the removal of the seatbelt latch assembly (e.g., seatbelt latch assembly 16) from the latch receiver (e.g., latch receiver 20). For example, the coupling assembly (e.g., coupling assembly 24) may be a spring-loaded locking mechanism configured to engage the latch plate (e.g., latch plate 18) of the seatbelt latch assembly (e.g., seatbelt latch assembly 16) when inserted, securing the latch plate (e.g., latch plate 18) of the seatbelt latch assembly (e.g., seatbelt latch assembly 16) firmly in place. The coupling assembly (e.g., coupling assembly 24) may be engineered to withstand significant impact forces, ensuring that the seatbelt system (e.g., remotely-lockable seatbelt system 10) does not inadvertently release during a collision or sudden deceleration.

The remotely-lockable seatbelt latch receptacle (e.g., remotely-lockable seatbelt latch receptacle 20) may also include a selectively-operable disengagement assembly (e.g., selectively-operable disengagement assembly 26) configured to override the coupling assembly (e.g., coupling assembly 24) to enable removal of the latch plate (e.g., latch plate 18) of the seatbelt latch assembly (e.g., seatbelt latch assembly 16) from the latch receiver (e.g., latch receiver 22).

Accordingly and to release the seatbelt latch assembly (e.g., seatbelt latch assembly 16) from the latch receiver (e.g., latch receiver 22), the occupant may press a release button (e.g., release button 28) on the remotely-lockable seatbelt latch receptacle (e.g., remotely-lockable seatbelt latch receptacle 20), which disengages the above-described spring-loaded locking mechanism, allowing the latch plate (e.g., latch plate 18) of the seatbelt latch assembly (e.g., seatbelt latch assembly 16) to be easily removed.

The remotely-lockable seatbelt latch receptacle (e.g., remotely-lockable seatbelt latch receptacle 20) may include electronic sensors (e.g., sensors 30) that detect whether the seatbelt system (e.g., remotely-lockable seatbelt system 10) is properly fastened. These sensors (e.g., sensors 30) may communicate with an onboard safety system (not shown) of the vehicle (e.g., vehicle 12), triggering warning indicators (not shown) on the dashboard (not shown) or an audible alarm if the seatbelt system (e.g., remotely-lockable seatbelt system 10) remains unbuckled while the vehicle (e.g., vehicle 12) is in motion. These sensors (e.g., sensors 30) may integrate with airbag deployment mechanisms (not shown), ensuring that airbags (not shown) deploy optimally based on the usage of the seatbelt system (e.g., remotely-lockable seatbelt system 10).

The remotely-lockable seatbelt latch receptacle (e.g., remotely-lockable seatbelt latch receptacle 20) may be designed with ergonomic and safety considerations in mind, ensuring that it is easy to use while maintaining structural integrity under extreme conditions. Its materials, typically a combination of reinforced plastic and high-strength metal, are typically chosen to provide both durability and reliability. Together with the latch assembly (e.g., seatbelt latch assembly 16), the remotely-lockable seatbelt latch receptacle (e.g., remotely-lockable seatbelt latch receptacle 20) ensures that occupants remain securely restrained, minimizing movement during normal driving, sudden stops, or collisions.

The selectively-operable disengagement assembly (e.g., selectively-operable disengagement assembly 26) may be configured to be externally controllable to prevent unauthorized removal of the seatbelt latch assembly (e.g., seatbelt latch assembly 16) from the latch receiver (e.g., latch receiver 22). Accordingly, the selectively-operable disengagement assembly (e.g., selectively-operable disengagement assembly 26) may be configured so that once a seatbelt system (e.g., remotely-lockable seatbelt system 10) is latched, it may only be unlatched in the event that such unlatching is authorized. Therefore, selectively-operable disengagement assembly (e.g., selectively-operable disengagement assembly 26) may be utilized to control e.g., the rear seatbelt systems (e.g., remotely-lockable seatbelt system 10) in a vehicle (e.g., vehicle 12) to prevent e.g., children that are wearing those seatbelts in that vehicle (e.g., vehicle 12) from unlatching those seatbelts unless e.g., the driver of the vehicle (e.g., vehicle 12) authorizes the same.

Accordingly, the selectively-operable disengagement assembly (e.g., selectively-operable disengagement assembly 26) may be configured to allow the seatbelt latch assembly (e.g., seatbelt latch assembly 16) to be removed from the latch receiver (e.g., latch receiver 22) in the event of an external authorization.

For example, this external authorization may be provided via an authorization signal (e.g., authorization signal 32) received from a remote device (e.g., remote device 34). One example of the remote device (e.g., remote device 34) may include but is not limited to a switch assembly included within the vehicle (e.g., vehicle 12). For example, such a switch assembly (e.g., remote device 34) may be positioned within reach of the driver of the vehicle (e.g., vehicle 12) so that the driver (e.g., driver 36) of the vehicle (e.g., vehicle 12) may authorize the unlatching of the seatbelts. While switch assembly (e.g., remote device 34) is shown to include a single switch, this is for illustrative purposes only and is not intended to be a limitation of this disclosure, as other configurations are possible and are considered to be within the scope of this disclosure. For example, the switch assembly (e.g., remote device 34) may be configured to allow for individual control off each of the rear seatbelts. Therefore, if there are three rear seatbelts in the rear of vehicle 12, the switch assembly (e.g., remote device 34) may include three discrete switches (i.e., one for each of the rear seatbelts). Further, the switch assembly (e.g., remote device 34) may be configured to allow for control of the rear seatbelts based upon rows. So in a vehicle (such as a minivan/large SUV) that has multiple rows of rear seats, the switch assembly (e.g., remote device 34) may be configured to allow control of the rear seatbelts a row at a time. For example, the driver of the vehicle (e.g., vehicle 12) may be able to control the $3^{rd}$ row seatbelts (i.e., where children are seated) but not control the $2^{nd}$ row seatbelts (i.e., where adults/teenagers are seated). Further and in such multirow vehicles, the switch assembly (e.g., remote device 34) may be configured to include a large quantity of switches that allow for individual control of each rear seatbelt within vehicle 12 (regardless of the row in which the particular seatbelt is located).

Another example of the remote device (e.g., remote device 34) that provides the authorization signal (e.g., authorization signal 32) may be a smart device that is incorporated into (or present within) the vehicle (e.g., vehicle 12). Examples of such a smart device may include but are not limited to a smartphone (e.g., an iPhone™ or an Android™ phone) that is coupled (e.g., via Bluetooth) to vehicle 12 and a navigation/infotainment system included within vehicle 12. In such a configuration, authorization signal 32 may be generated via one or more voice commands provided by driver 36 of vehicle 12. Accordingly, driver 36 may state the verbal command "allow unbuckling", which may be received by the smart device (e.g., remote device 34), wherein the smart device may process these verbal commands and generate authorization signal 32, which may be provided to the selectively-operable disengagement assembly (e.g., selectively-operable disengagement assembly 26).

For example, in the event that your children get in the back seat of the vehicle (e.g., vehicle 12), it is easy to tell when their seatbelts are buckled because audible and/or visual indicators may be provided to indicate that the rear seat passengers are not buckled. However and once they are buckled, these rear seat passengers may unbuckle their seatbelts at will. Accordingly, the seatbelt system (e.g., remotely-lockable seatbelt system 10) may avoid such a situation by preventing the rear seat passengers from unbuckling their seatbelts unless such unbuckling is authorized.

Accordingly and upon the driver (e.g., driver 36) providing authorization signal 32 via the remote device (e.g., remote device 34), the rear seat occupants will be able to unlatch their seatbelts. And until/unless authorization signal 32 is received from the remote device (e.g., remote device 34), the rear seat occupants will not be able to unlatch their seatbelts (thus ensuring that the rear seat occupants remain buckled unless authorized to unbuckle).

For safety reasons, the selectively-operable disengagement assembly (e.g., selectively-operable disengagement assembly 26) may be configured to allow the seatbelt latch assembly (e.g., seatbelt latch assembly 16) to be removed from the latch receiver (e.g., latch receiver 22) in the event of an emergency situation concerning the vehicle (e.g., vehicle 12). For example, the selectively-operable disengagement assembly (e.g., selectively-operable disengagement assembly 26) may be configured to allow the seatbelt latch assembly (e.g., seatbelt latch assembly 16) to be removed from the latch receiver (e.g., latch receiver 22) in the event of e.g., a fire event, a rollover event, an engine failure event, etc. Such an emergency situation may be sensed by various sensors (e.g., sensor 37) positioned within vehicle 12. For example, an orientation sensor may be configured to sense the orientation of vehicle 12 (e.g., upside down versus right-side up); a thermal/smoke sensor may be configured to senser heat or smoke inside vehicle 12; an engine sensor may be configured to sense an engine failure event; etc. Accordingly and in the event of such an emergency situation occurring, an authorization signal (e.g., authorization signal 32) may be automatically provided to the selectively-operable disengagement assembly (e.g., selectively-operable disengagement assembly 26) to enable the rear seat occupants to unlatch their seatbelts and exit vehicle 12.

Additionally, the selectively-operable disengagement assembly (e.g., selectively-operable disengagement assembly 26) may be configured to allow the seatbelt latch assembly (e.g., seatbelt latch assembly 16) to be removed from the latch receiver (e.g., latch receiver 20) in the event of an accident concerning the vehicle (e.g., vehicle 12). For example, the selectively-operable disengagement assembly (e.g., selectively-operable disengagement assembly 26) may be configured to allow the seatbelt latch assembly (e.g., seatbelt latch assembly 16) to be removed from the latch receiver (e.g., latch receiver 22) in the event of e.g., a high-G deceleration event being sensed by sensor 37 within the vehicle (e.g., vehicle 12), an airbag deployment within the vehicle (e.g., vehicle 12), etc. Accordingly and in the event of such an accident situation occurring, an authorization signal (e.g., authorization signal 32) may be automatically provided to the selectively-operable disengagement assembly (e.g., selectively-operable disengagement assembly 26) to enable the rear seat occupants to unlatch their seatbelts and exit vehicle 12.

The above-described selectively-operable disengagement assembly (e.g., selectively-operable disengagement assembly 26) may include a disengagement mechanism (e.g., disengagement mechanism 38) configured to interface with and override the coupling assembly (e.g., coupling assembly 24) to enable removal of the seatbelt latch assembly (e.g., seatbelt latch assembly 16) from the latch receiver (e.g., latch receiver 22).

And in order to accomplish such control and prevent such unauthorized unbuckling of the seatbelt system (e.g., remotely-lockable seatbelt system 10), the selectively-operable disengagement assembly (e.g., selectively-operable disengagement assembly 26) may be configured to disable the disengagement mechanism (e.g., disengagement mechanism 38) to prevent removal of the seatbelt latch assembly (e.g., seatbelt latch assembly 16) from the latch receiver (e.g., latch receiver 22). For example, the selectively-operable disengagement assembly (e.g., selectively-operable disengagement assembly 26) may be configured to disable the disengagement mechanism (e.g., disengagement mechanism 38) via e.g., an actuator (e.g., actuator 40) that decouples the disengagement mechanism (e.g., disengagement mechanism 38) from the coupling assembly (e.g., coupling assembly 24). Therefore and in such a configuration, depressing a release button (e.g., release button 28) on the remotely-lockable seatbelt latch receptacle (e.g., remotely-lockable seatbelt latch receptacle 20) that is coupled to the disengagement mechanism (e.g., disengagement mechanism 38) would not disengage the coupling assembly (e.g., coupling assembly 24), thus preventing the removal of the seatbelt latch assembly (e.g., seatbelt latch assembly 16) from the latch receiver (e.g., latch receiver 22).

Additionally/alternatively, the selectively-operable disengagement assembly (e.g., selectively-operable disengagement assembly 26) may be configured to prevent operation of the disengagement mechanism (e.g., disengagement mechanism 38), thus preventing removal of the seatbelt latch assembly (e.g., seatbelt latch assembly 16) from the latch receiver (e.g., latch receiver 22). Continuing with the above-stated example in which the disengagement mechanism (e.g., disengagement mechanism 38) is coupled to the coupling assembly (e.g., coupling assembly 24) to enable removal of the seatbelt latch assembly (e.g., seatbelt latch assembly 16) from the latch receiver (e.g., latch receiver 22), assume that the selectively-operable disengagement assembly (e.g., selectively-operable disengagement assembly 26) may be configured to disable the disengagement mechanism (e.g., disengagement mechanism 38) via e.g., an actuator (e.g., actuator 42) that locks the disengagement mechanism (e.g., disengagement mechanism 38). Therefore and in such a configuration, depressing a release button (e.g., release button 28) on the remotely-lockable seatbelt latch receptacle (e.g., remotely-lockable seatbelt latch receptacle 20) that is coupled to the disengagement mechanism (e.g., disengagement mechanism 38) would not disengage the coupling assembly (e.g., coupling assembly 24), thus preventing the removal of the seatbelt latch assembly (e.g., seatbelt latch assembly 16) from the latch receiver (e.g., latch receiver 22).

General

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A remotely-lockable seatbelt latch receptacle configured for use within a vehicle comprising:
   a latch receiver configured to receive a seatbelt latch assembly;
   a coupling assembly configured to releasably engage a portion of the seatbelt latch assembly and temporarily prevent the removal of the seatbelt latch assembly from the latch receiver; and
   a selectively-operable disengagement assembly configured to override the coupling assembly to enable removal of the seatbelt latch assembly from the latch receiver, wherein the selectively-operable disengagement assembly includes a disengagement mechanism configured to interface with and override the coupling assembly to enable removal of the seatbelt latch assembly from the latch receiver, wherein the selectively-operable disengagement assembly is configured to disable the disengagement mechanism to prevent removal of the seatbelt latch assembly from the latch receiver via a first actuator that decouples the disengagement mechanism from the coupling assembly.

2. The remotely-lockable seatbelt latch receptacle of claim 1 wherein the selectively-operable disengagement assembly is configured to be externally controllable to prevent unauthorized removal of the seatbelt latch assembly from the latch receiver.

3. The remotely-lockable seatbelt latch receptacle of claim 1 wherein the selectively-operable disengagement assembly is configured to allow the seatbelt latch assembly to be removed from the latch receiver in the event of an external authorization.

4. The remotely-lockable seatbelt latch receptacle of claim 1 wherein the external authorization is provided via an authorization signal received from a remote device.

5. The remotely-lockable seatbelt latch receptacle of claim 4 wherein the remote device is a switch assembly included within the vehicle.

6. The remotely-lockable seatbelt latch receptacle of claim 1 wherein the selectively-operable disengagement assembly is configured to allow the seatbelt latch assembly to be removed from the latch receiver in the event of an emergency situation concerning the vehicle.

7. The remotely-lockable seatbelt latch receptacle of claim 1 wherein the selectively-operable disengagement assembly is configured to allow the seatbelt latch assembly to be removed from the latch receiver in the event of an accident concerning the vehicle.

8. The remotely-lockable seatbelt latch receptacle of claim 1 wherein the selectively-operable disengagement assembly is configured to prevent operation of the disengagement mechanism to prevent removal of the seatbelt latch assembly from the latch receiver.

9. A remotely-lockable seatbelt system for use within a vehicle comprising:
   a belt assembly;
   a seatbelt latch assembly coupled to the belt assembly; and
   a remotely-lockable seatbelt latch receptacle configured to releasably engage a portion of the seatbelt latch assembly, wherein the remotely-lockable seatbelt latch receptacle includes:
      a latch receiver configured to receive the seatbelt latch assembly;
      a coupling assembly configured to releasably engage a portion of the seatbelt latch assembly and temporarily prevent the removal of the seatbelt latch assembly from the latch receiver; and
      a selectively-operable disengagement assembly configured to override the coupling assembly to enable removal of the seatbelt latch assembly from the latch receiver, wherein the selectively-operable disengagement assembly is configured to allow the seatbelt latch assembly to be removed from the latch receiver in the event of an external authorization, wherein the selectively-operable disengagement assembly includes a disengagement mechanism configured to interface with and override the coupling assembly to enable removal of the seatbelt latch assembly from the latch receiver, wherein the selectively-operable disengagement assembly is configured to disable the disengagement mechanism to prevent removal of the seatbelt latch assembly from the latch receiver via a first actuator that decouples the disengagement mechanism from the coupling assembly.

10. The remotely-lockable seatbelt system of claim 9 wherein the selectively-operable disengagement assembly is configured to be externally controllable to prevent unauthorized removal of the seatbelt latch assembly from the latch receiver.

11. The remotely-lockable seatbelt system of claim 9 wherein the external authorization is provided via an authorization signal received from a remote device.

12. The remotely-lockable seatbelt system of claim 11 wherein the remote device is a switch assembly included within the vehicle.

13. The remotely-lockable seatbelt system of claim 9 wherein the selectively-operable disengagement assembly is configured to allow the seatbelt latch assembly to be removed from the latch receiver in the event of an emergency situation concerning the vehicle.

14. The remotely-lockable seatbelt system of claim 9 wherein the selectively-operable disengagement assembly is configured to allow the seatbelt latch assembly to be removed from the latch receiver in the event of an accident concerning the vehicle.

15. The remotely-lockable seatbelt system of claim 9 wherein the selectively-operable disengagement assembly is configured to prevent operation of the disengagement mechanism to prevent removal of the seatbelt latch assembly from the latch receiver.

16. A remotely-lockable seatbelt system for use within a vehicle comprising:
   a belt assembly;
   a seatbelt latch assembly coupled to the belt assembly; and
   a remotely-lockable seatbelt latch receptacle configured to releasably engage a portion of the seatbelt latch assembly, wherein the remotely-lockable seatbelt latch receptacle is configured to be externally controllable to prevent unauthorized removal of the seatbelt latch assembly from the latch receiver and includes:
      a latch receiver configured to receive the seatbelt latch assembly,
      a coupling assembly configured to releasably engage a portion of the seatbelt latch assembly and temporarily prevent the removal of the seatbelt latch assembly from the latch receiver, and
      a selectively-operable disengagement assembly configured to override the coupling assembly to enable removal of the seatbelt latch assembly from the latch receiver, wherein the selectively-operable disengagement assembly includes a disengagement mechanism configured to interface with and override the coupling assembly to enable removal of the seatbelt latch assembly from the latch receiver, wherein the selectively-operable disengagement assembly is configured to disable the disengagement mechanism to prevent removal of the seatbelt latch assembly from the latch receiver via a first actuator that decouples the disengagement mechanism from the coupling assembly.

17. The remotely-lockable seatbelt system of claim 16 wherein the selectively-operable disengagement assembly is configured to allow the seatbelt latch assembly to be removed from the latch receiver in the event of an external authorization.

18. The remotely-lockable seatbelt system of claim 17 wherein the external authorization is provided via an authorization signal received from a remote device.

19. The remotely-lockable seatbelt system of claim 18 wherein the remote device is a switch assembly included within the vehicle.

20. The remotely-lockable seatbelt system of claim 16 wherein the selectively-operable disengagement assembly is configured to allow the seatbelt latch assembly to be removed from the latch receiver in the event of an emergency situation concerning the vehicle.

21. The remotely-lockable seatbelt system of claim 16 wherein the selectively-operable disengagement assembly is configured to allow the seatbelt latch assembly to be removed from the latch receiver in the event of an accident concerning the vehicle.

22. The remotely-lockable seatbelt system of claim 16 wherein the selectively-operable disengagement assembly is configured to prevent operation of the disengagement mechanism to prevent removal of the seatbelt latch assembly from the latch receiver.

* * * * *